(12) United States Patent
Li et al.

(10) Patent No.: US 7,483,083 B2
(45) Date of Patent: Jan. 27, 2009

(54) MOVIE ENHANCEMENT

(75) Inventors: Wei Li, San Jose, CA (US); Chung-Tao Chu, San Jose, CA (US); Andy Chao Hung, Los Altos, CA (US)

(73) Assignee: Intervideo, Inc., Frement, CA (US)

( * ) Notice: Subject to any disclaimer, the term of this patent is extended or adjusted under 35 U.S.C. 154(b) by 543 days.

(21) Appl. No.: 10/822,742

(22) Filed: Apr. 13, 2004

(65) Prior Publication Data

US 2004/0207759 A1 Oct. 21, 2004

(51) Int. Cl.
*H04N 6/48* (2006.01)
*H04N 9/73* (2006.01)
*H04N 5/202* (2006.01)
*G09G 5/02* (2006.01)

(52) U.S. Cl. .............. 348/673; 348/678; 348/687; 348/655; 348/645; 348/674; 345/589; 382/254; 382/270

(58) Field of Classification Search .............. 348/673, 348/674, 678, 687, 655, 645; 382/169, 254, 382/270, 272, 274; 345/589
See application file for complete search history.

(56) References Cited

U.S. PATENT DOCUMENTS

| 5,450,216 | A | * | 9/1995 | Kasson ....................... 358/518 |
|---|---|---|---|---|
| 5,473,373 | A | * | 12/1995 | Hwung et al. ............... 348/254 |
| 5,724,456 | A | * | 3/1998 | Boyack et al. ............... 382/274 |
| 5,874,988 | A | * | 2/1999 | Gu ............................... 348/97 |
| 5,940,530 | A | * | 8/1999 | Fukushima et al. ......... 382/164 |
| 6,018,588 | A | * | 1/2000 | Kim ............................ 382/167 |
| 6,062,817 | A | * | 5/2000 | Danowski et al. ......... 416/97 R |
| 6,078,686 | A | * | 6/2000 | Kim ............................ 382/167 |
| 6,137,904 | A | * | 10/2000 | Lubin et al. ................. 382/162 |
| 6,263,101 | B1 | * | 7/2001 | Klein .......................... 382/162 |
| 6,360,022 | B1 | * | 3/2002 | Lubin et al. ................. 382/260 |
| 6,507,372 | B1 | * | 1/2003 | Kim ............................ 348/630 |
| 6,600,518 | B1 | * | 7/2003 | Bakhmutsky et al. ....... 348/625 |
| 6,654,504 | B2 | * | 11/2003 | Lubin et al. ................. 382/254 |
| 6,850,214 | B2 | * | 2/2005 | Nishitani et al. .............. 345/87 |
| 6,952,235 | B2 | * | 10/2005 | Park et al. .................... 348/379 |
| 6,952,503 | B2 | * | 10/2005 | Matsuura .................... 382/274 |
| 7,013,042 | B1 | * | 3/2006 | Yamada et al. .............. 382/167 |
| 7,102,695 | B2 | * | 9/2006 | Han et al. .................... 348/673 |
| 7,102,697 | B2 | * | 9/2006 | Lei et al. ..................... 348/678 |
| 7,158,146 | B2 | * | 1/2007 | Ohga .......................... 345/589 |
| 2002/0031277 | A1 | * | 3/2002 | Lubin et al. ................. 382/254 |
| 2003/0103057 | A1 | * | 6/2003 | Graves et al. ............... 345/589 |
| 2003/0128220 | A1 | * | 7/2003 | Ubillos ....................... 345/593 |

(Continued)

*Primary Examiner*—Brian P Yenke
(74) *Attorney, Agent, or Firm*—Rosenberg, Klein & Lee (57) ABSTRACT

A method for enhancing video or other multimedia in order to achieve a closer-to-movie theater viewing experience. The enhancement method can be applied to YUV or other video formats which are used for TV or digital media. The method provides a curve with at least one inflection point such that at least one region has a concave upward arc and another region has a concave downward arc. The improved curve provides relatively less contrast in relatively dark regions and relatively more contrast in relatively bright regions. By taking into account the visual sensitivity to various luminance levels, a neutral point is selected to be located at a relatively dark point. To the darker side of the neutral point, luminance is suppressed. To the brighter side of the neutral point, luminance is enhanced. This luminance-mapping curve is applied to the luminance (Y) signal so as to enhance both brightness and contrast.

10 Claims, 9 Drawing Sheets

U.S. PATENT DOCUMENTS

2003/0133609 A1* 7/2003 Ubillos et al. ............... 382/167
2004/0091169 A1* 5/2004 Park et al. ................... 382/274
2005/0062891 A1* 3/2005 Tang et al. .................. 348/607

* cited by examiner

MOVIE ENHANCEMENT

BACKGROUND OF THE INVENTION

1. Field of the Invention

The present invention relates to multimedia. More specifically, the present invention discloses a method of enhancing movies, video, or other multimedia in order to provide users with a more rewarding viewing experience.

2. Description of the Prior Art

Film is a popular form of art or entertainment. The affect on movie-goers is dramatic when movies are viewed in a cinema or movie theater. When movies are made or reproduced, care is taken to ensure that the lighting, brightness, and contrast of the film is suitable for the dim or dark theater setting. However, problems result when these movies are transferred from film to digital formats such as video compact disc (VCD) or digital video disc (DVD).

It is a common problem that movies look too dark when watched on televisions (TV), cathode ray tube (CRT) monitors, or liquid crystal display (LCD) panels. Because many movies are intended for playback in a relatively dark environment, such as a movie theater, video usually appears to be lacking in brightness and contrast when played back in a relatively well-lit environment, such as regular room lighting. A conventional way to compensate for this problem is to change the display device's brightness level and/or gamma correction strength. However, an increase in brightness will typically result in a lack of blackness. Additionally, an increase in gamma will typically result in too little contrast in bright regions and too much contrast in dark regions of the movie.

Figure 1:
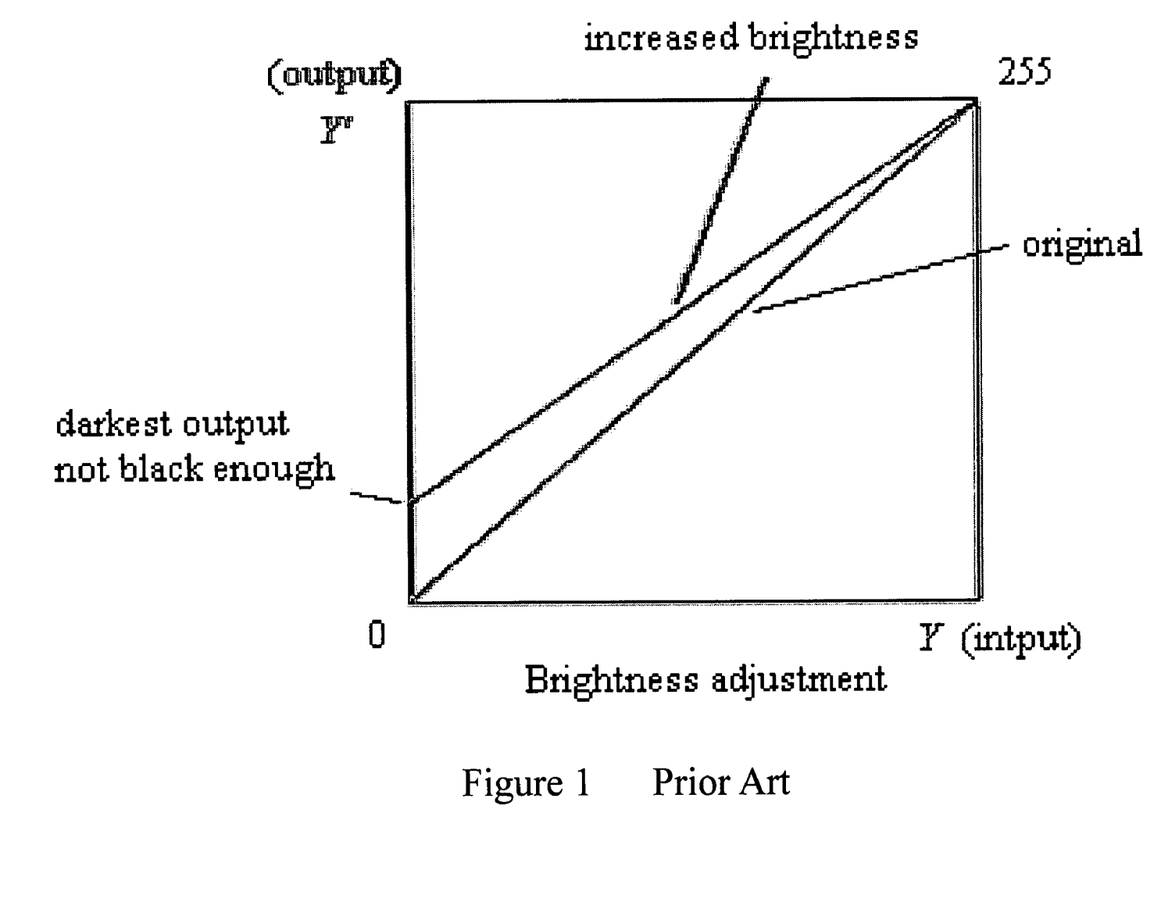
FIG. 1 is a graph illustrating the effect of increasing brightness of a video signal.

Refer to FIG. 1, which is a graph illustrating the effect of increasing brightness of a video signal. As shown in FIG. 1, the original brightness level is represented as a straight line from 0 to 255. In contrast as shown by the adjusted output line, increasing the brightness results in a more dramatic increase in brightness of darker regions than in areas which are already relatively bright. As a result, the darkest output in no longer black enough and the overall video output appears washed out.

Figure 2:
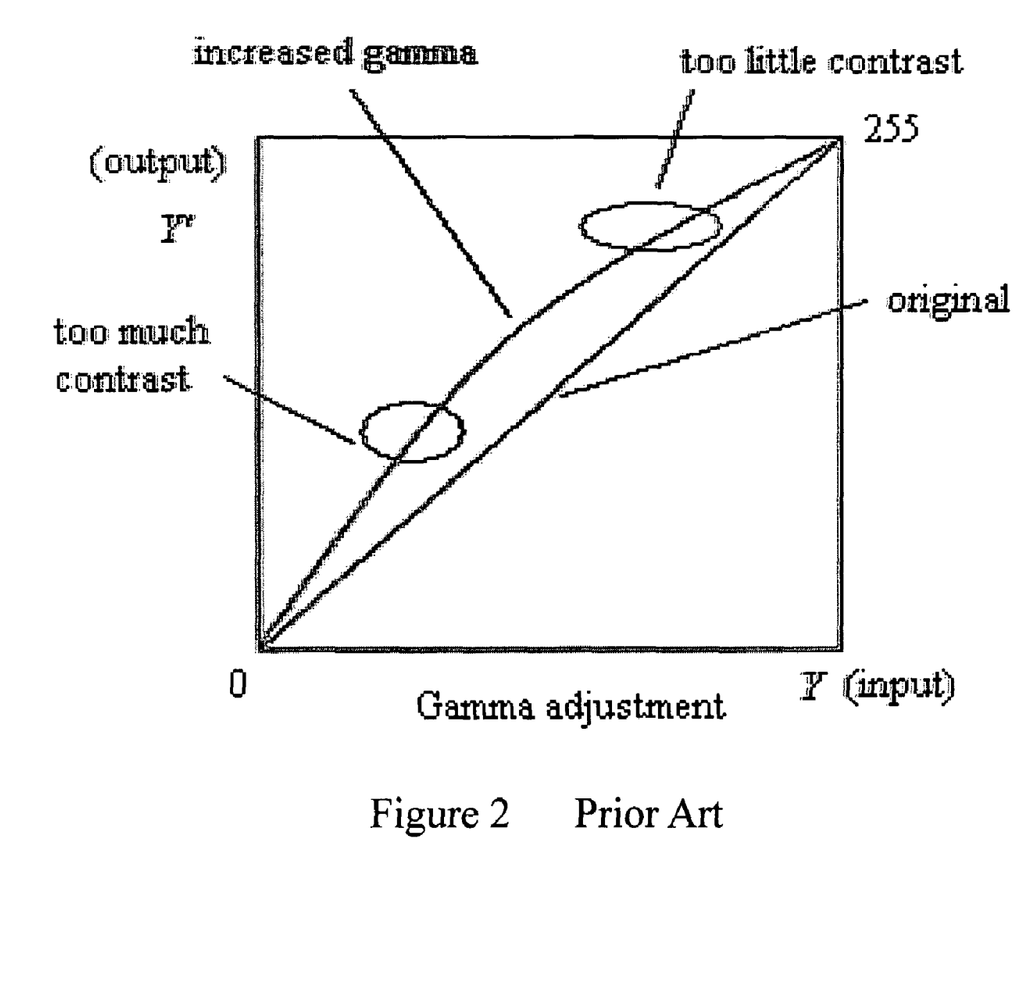
FIG. 2 is a graph illustrating the effect of increasing gamma of a video signal.

Refer to FIG. 2, which is a graph illustrating the effect of increasing gamma of a video signal. In FIG. 2, the original gamma is represented as a straight line from 0 to 255. By increasing the gamma, the output which is brighter ends up having too little contrast and the output which is darker ends up having too much contrast. Therefore, the picture quality is not optimal.

Therefore, there is need for an improved method of enhancing movies or video which results in a high quality video output and provides viewers with a rewarding viewing experience.

SUMMARY OF THE INVENTION

To achieve these and other advantages and in order to overcome the disadvantages of the conventional method in accordance with the purpose of the invention as embodied and broadly described herein, the present invention provides a movie enhancement method which corrects the video image so that the brightness and contrast levels are proper when the video is viewed in a well-lit environment.

In order to achieve a closer-to-movie theater viewing experience, the present invention provides a method of enhancing video or movies. The enhancement method can be applied to YUV or other video formats which are used for TV or digital media. Additionally, the method can be applied to any video format, such as HSV, RGB, etc. that can be converted or transformed into YUV.

In embodiments of the present invention, the method provides a curve with at least one inflection point such that at least one region has a concave upward arc and another region has a concave downward arc.

In an embodiment, the improved curve provides relatively less contrast in relatively dark regions and relatively more contrast in relatively bright regions. By taking into account the visual sensitivity to various luminance levels, a neutral point is selected to be located at a relatively dark point. To the darker side of the neutral point, luminance is suppressed. To the brighter side of the neutral point, luminance is enhanced. This improved curve is termed a "luminance-mapping" curve and is applied to the luminance (Y) signal so as to enhance both brightness and contrast.

In another embodiment, the luminance-mapping curve is adaptively adjusted over time according to the average luminance level of the input signal. By taking into account the effect of the luminance mapping over the average luminance level and the fact that the luminance level varies over time, the luminance-mapping curve can be shifted in order to keep the video with good contrast and preserve the average luminance level after luminance mapping through time. This is achieved by measuring the mean and variance of the luminance signal and generating an adjustment to the luminance-mapping curve according to the measurements.

In order to preserve the color saturation level, the chrominance signals (UN) an also be adjusted according to the change in Y.

To improve the color saturation level, a chrominance-mapping curve is designed to improve the contrast of color U/V components. In an embodiment, this curve is configured to have a neutral point at the mid-point.

In other embodiments, movie enhancement can be applied to regions. Regions can be overlapped and each can have its own variation of enhancement. Therefore, movie enhancement can be used with object detection and image segmentation algorithms. It can also be used with MPEG4. In this case, movie enhancement can be used with background or frontobjects. In other cases, it can be used with the original movie content and subtitles can be blended later.

In other embodiments, movie enhancement can also be a temporal filter. For interlaced content, movie enhancement can be applied to each field.

Some embodiments may introduce coarse edges due to high contrast in certain luminance levels. In these cases, dithering can be used to reduce the effect.

Other areas which can utilize the movie enhancement method are flickering compensation for florescent light, scene change detection, fade detection, used with other special effects in which subjects change with time, and used in another color space, like HSV, to change tone of color.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the preferred embodiments of the present invention, examples of which are illustrated in the accompanying drawings. Wherever possible, the same reference numbers are used in the drawings and the description to refer to the same or like parts.

In an embodiment of the present invention, the movie enhancement method is adjustable through two parameters: intensity and variation. These parameters can be set by the user according to the user's personal preference. Y, U, V are scaled to have a normal range of 0~255 with a center at 128. It will be understood by one of ordinary skill in the art that other ranges can also be applied in similar formats. This embodiment has been implemented with InterVideo Inc.'s WinDVD which is the most popular PC-based software DVD player in the world. WinDVD has also designed a dedicated UI to control these parameters.

Figure 3:
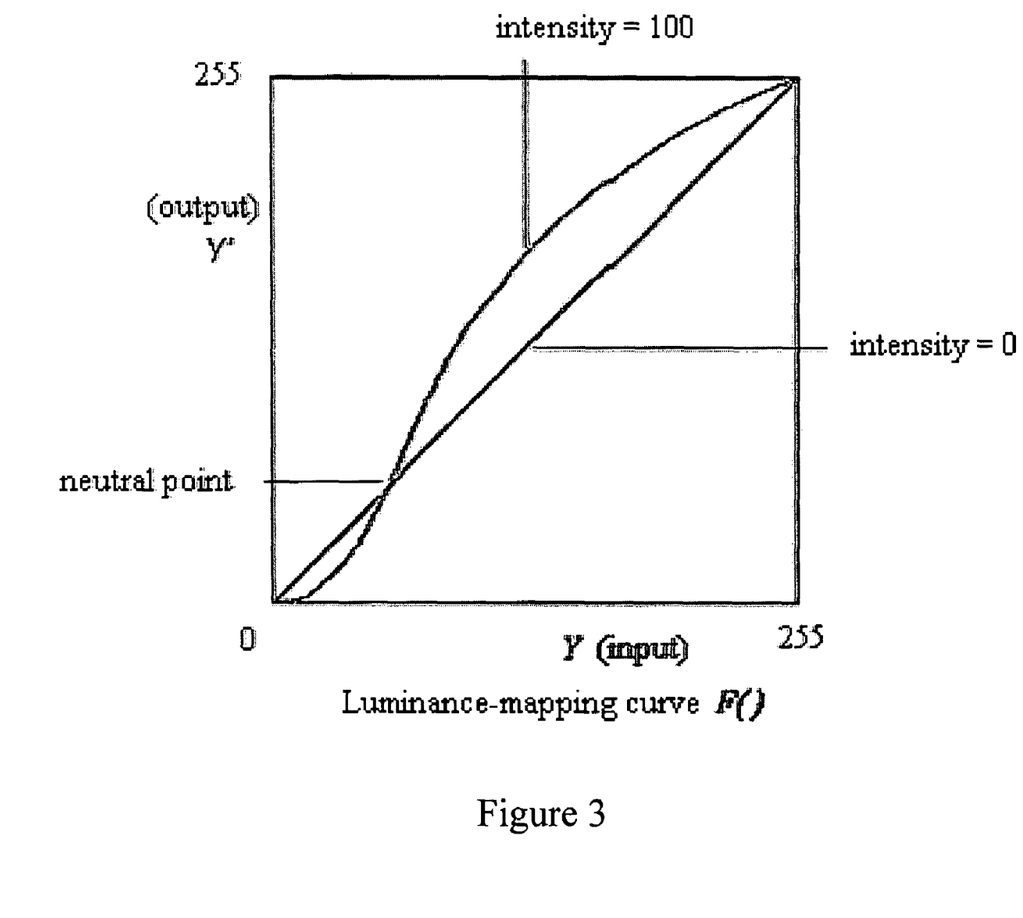
FIG. 3 is a graph illustrating a luminance-mapping curve according to an embodiment of the present invention.

Refer to FIG. 3, which is a graph illustrating a luminance-mapping curve according to an embodiment of the present invention.

Intensity is used to control the amount of adjustment applied to Y. In an embodiment, the change is one-directional, a value of 0 corresponds to no effect, and a value of 100 corresponds to maximum effect. It will be understood by one of ordinary skill in the art that other scales and ranges can also be used.

The luminance-mapping transfer function is F( ), which is a 1-to-1 mapping of the Y signal. One embodiment of the luminance-mapping curve is configured to increase luminance on the bright side of a neutral point, and to decrease luminance on the dark side of the neutral point. Advantageously, the neutral point can be located at a relatively dark point of the luminance range to address the issue of visual sensitivity to various luminance levels:

$$Y'=F(Y)$$

Intensity is i, which is one of the control elements and has a value between 0 and 100. The luminance mapping based on intensity is adjusted:

$$F(Y,i)=Y+(F(Y)-Y)*i/100, \text{ where}$$

$$F(Y,100)=F(Y), F(Y,0)=Y$$

Figure 4:
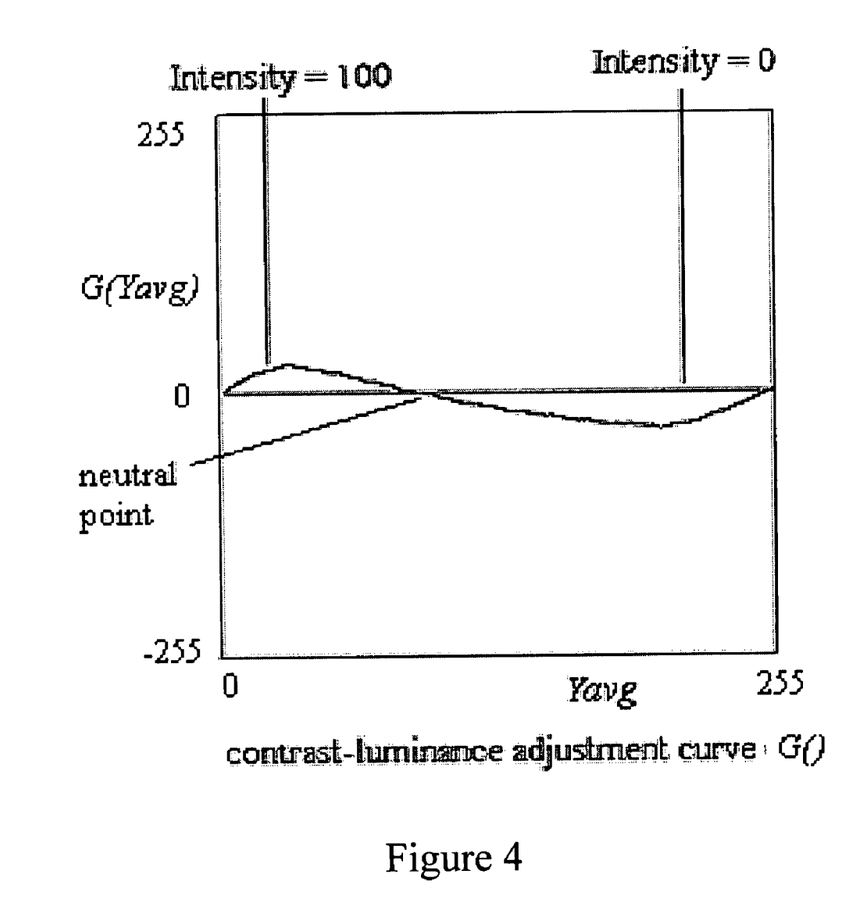
FIG. 4 is a graph illustrating a contrast-luminance adjustment curve according to an embodiment of the present invention.

Refer to FIG. 4, which is a graph illustrating a contrast-luminance adjustment curve according to an embodiment of the present invention.

G( ) is a "luminance-contrast adjustment" transfer function, which is closely related to F( ) and, in one embodiment, generates an adjustment to the luminance level based on the mean luminance signal of the video. G( ) moves the input signal toward the center of F( ) which has relatively high contrast. Also, G( ) helps keep the average luminance at a constant level at the output. In one embodiment, G( ) and F( ) have the same neutral point location, where the luminance level is not changed.

The luminance-contrast adjustment can be further weighted by the variance of the luminance signal. Signals with relatively large variance typically use less luminance-contrast adjustment, and signals with relatively small variance typically use more luminance-contrast adjustment. Let sqrt( ) be the square-root operator, $Y_{var}$ be the variance of Y signal, and $Y_{max}$ be the maximum range of Y. In one embodiment, the following formula is used to provide a weighting in the range of about 0.5~2.0.

$$(2*Y_{max}-sqrt(Y_{var}))/(sqrt(Y_{var})+Y_{max})$$

To provide consistent contrast and average luminance over time, one embodiment measures the average $Y_{avg}$ and variance $Y_{var}$ of the luminance signal for each video frame. It is understood that in other embodiments, the average $Y_{avg}$ and variance $Y_{var}$ can be computed from selected frames, such as, for example, every other frame or every second.

$$g=G(Y_{avg})*(2*Y_{max}-sqrt(Y_{var}))/(sqrt(Y_{var})+Y_{max})$$

Figure 5:
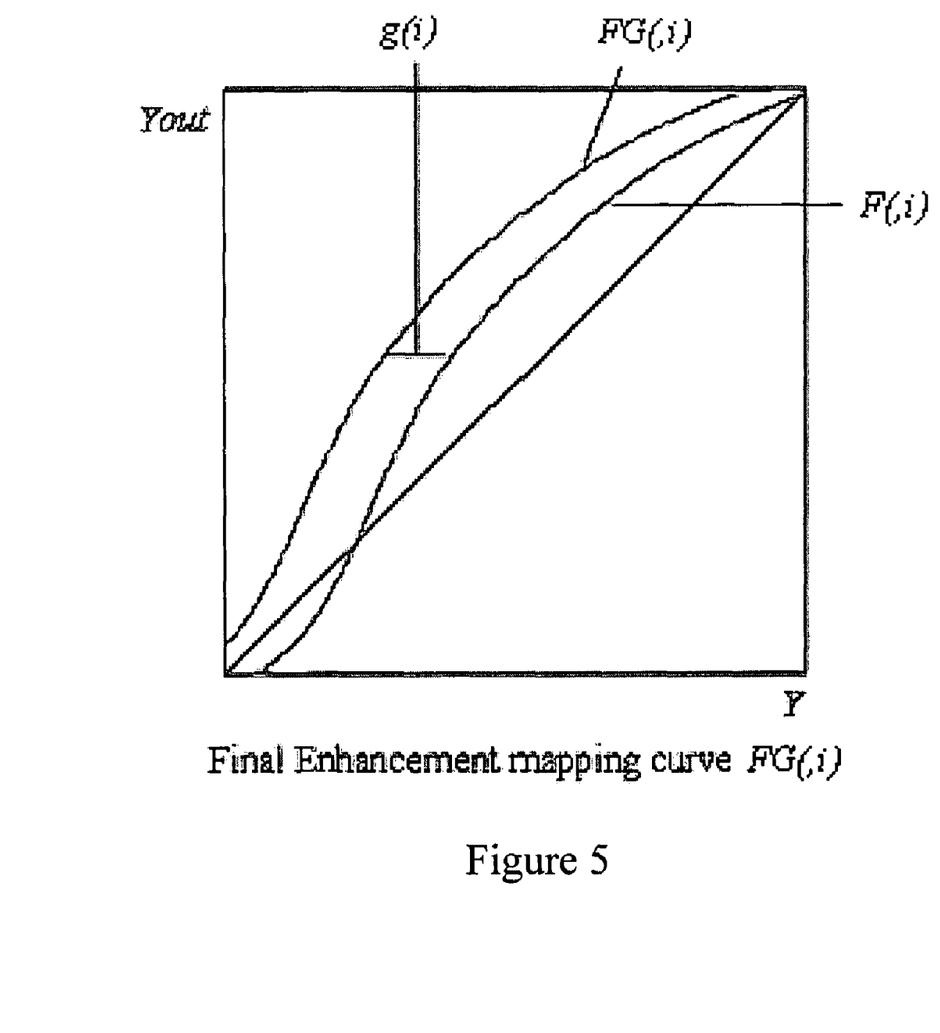
FIG. 5 is a graph illustrating a final enhancement mapping curve according to an embodiment of the present invention.

Refer to FIG. 5, which is a graph illustrating a final enhancement mapping curve according to an embodiment of the present invention.

The luminance-contrast adjustment based on control factor intensity is g(i), $$g(i)=g*i/100$$

Thus for each video frame, based on input luminance and control intensity, the final enhancement mapping transfer function FG( ) for the luminance signal (Y), is obtained.

$$FG(Y,i)=F(Y+g(i),i)$$

There can be some hard-clippings at both ends of the FG( ) curve after the luminance-contrast adjustment. These ends of the FG( ) curve can be re-interpolated to provide a soft-clipping effect.

Figure 8A:
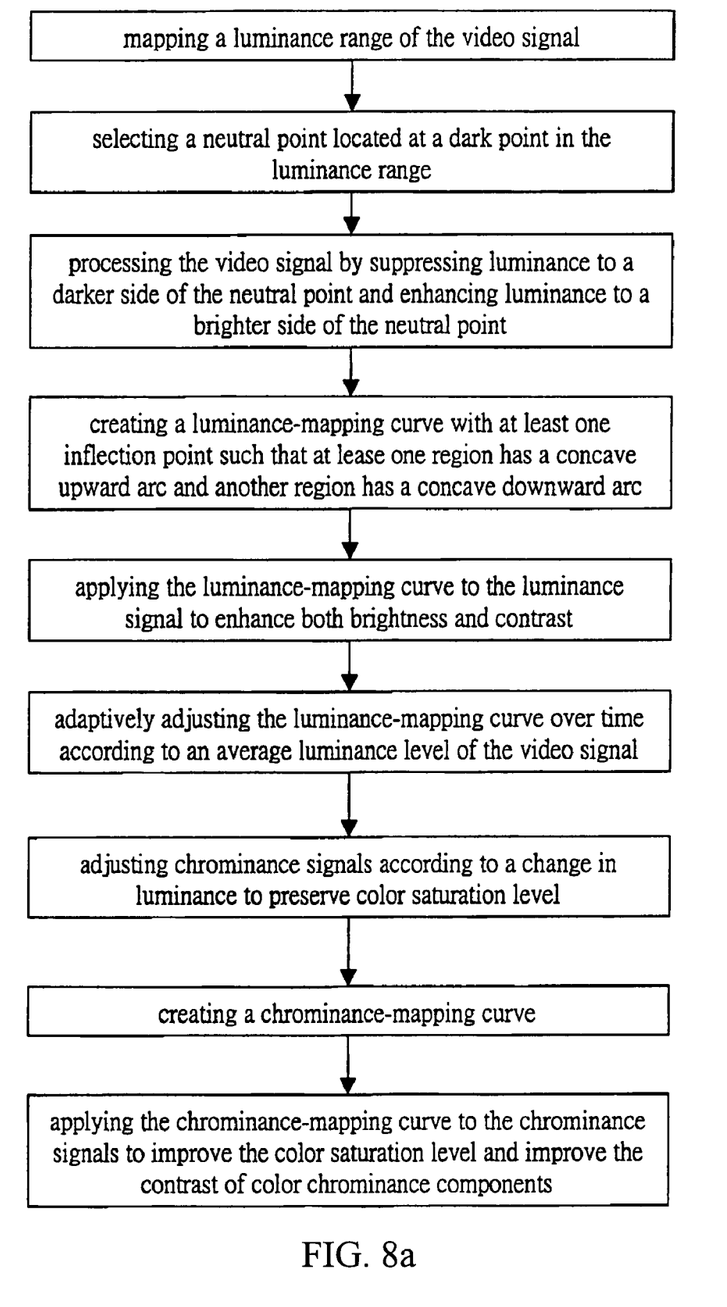
Figure 8B:
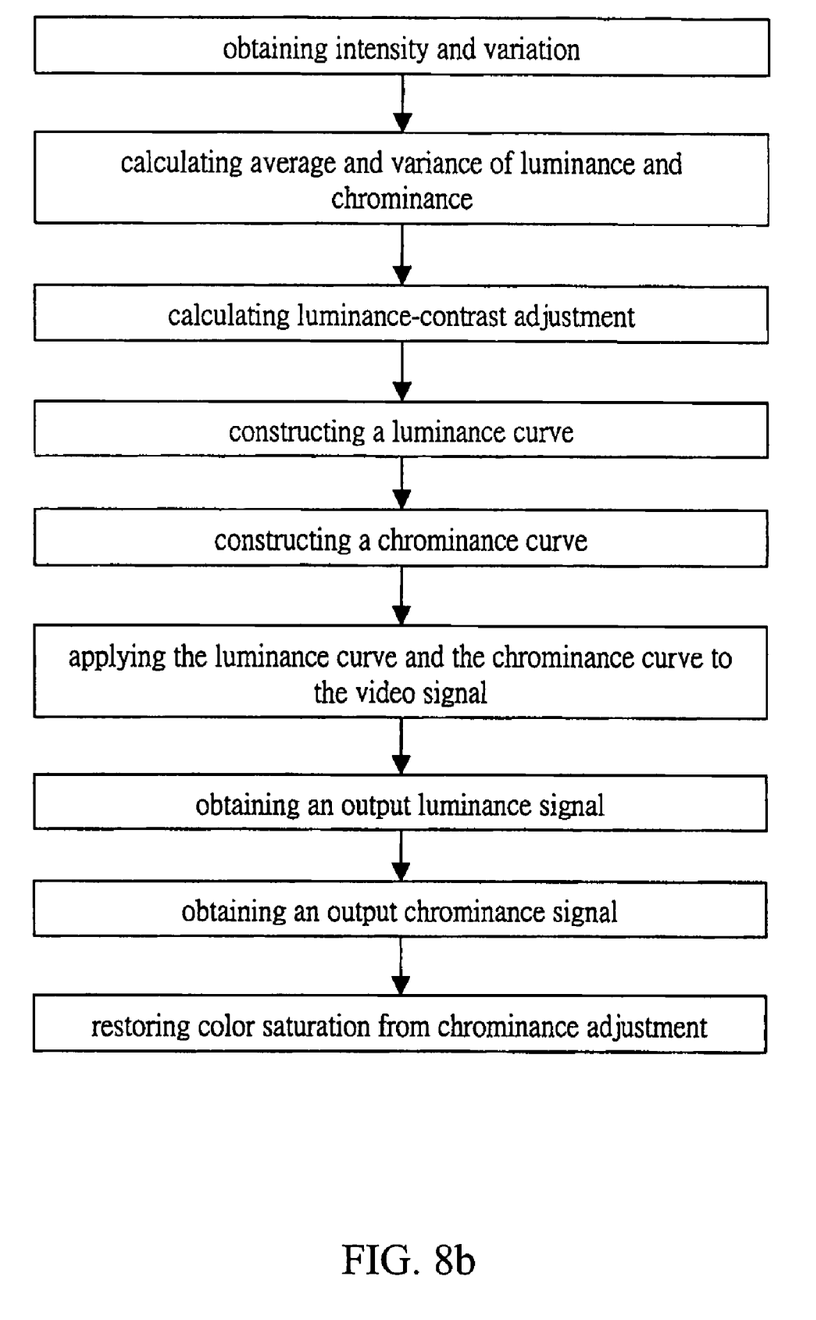
FIG. 8b is a flow diagram illustrating a flow of processes for restoring color saturation from luminance adjustment in accordance with an exemplary embodiment of the present invention; and, FIG. 8c is a flow diagram illustrating in greater detail a flow of processes for restoring color saturation from luminance adjustment in accordance with an exemplary embodiment of the present invention.
Figure 8C:
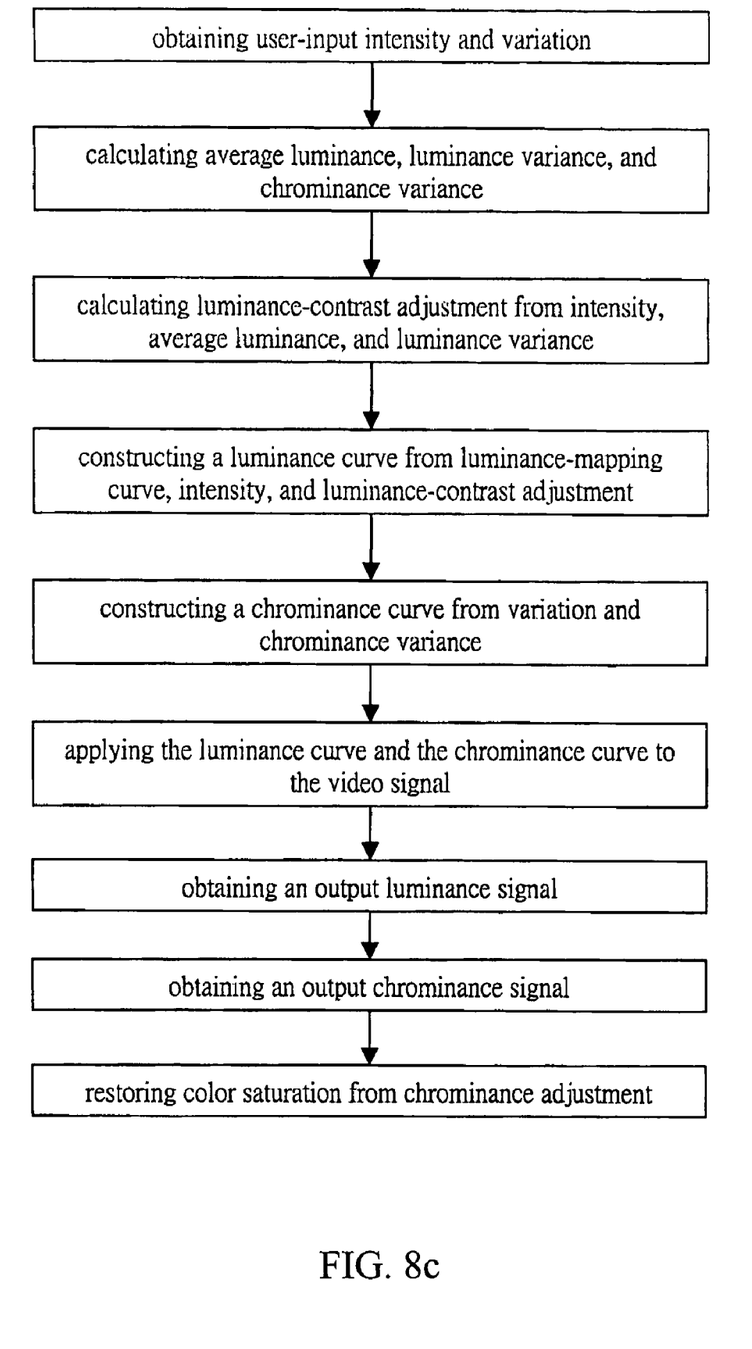

To preserve the color saturation level, the U/Y signal can be adjusted as follows:

$$U_{out}=(U-128)*Y_{out}/Y+128$$

$$V_{out}=(V-128)*Y_{out}/Y+128$$

Additionally, the actual calculation can be simplified to avoid division in implementation through fixed-point computation.

Figure 6:
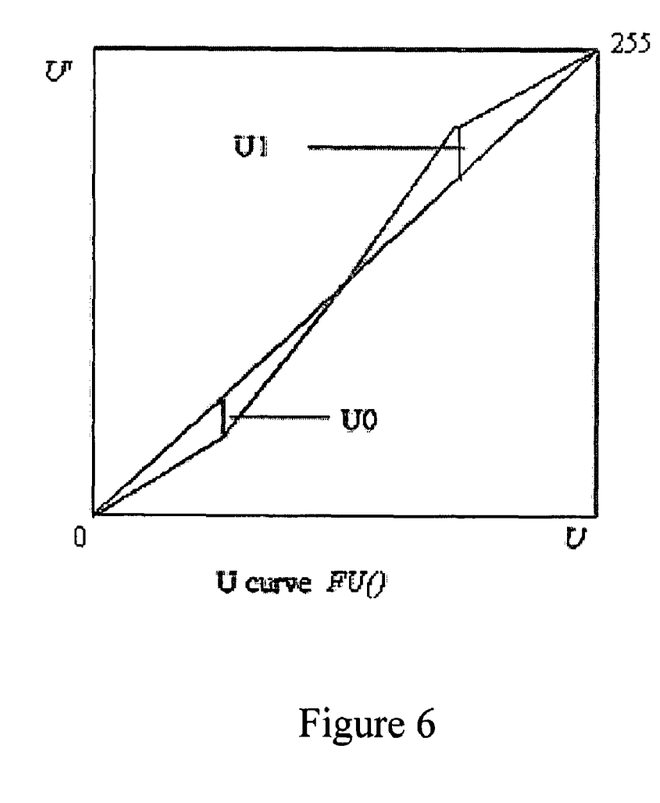
FIG. 6 is a graph illustrating a U curve according to an embodiment of the present invention.
Figure 7:
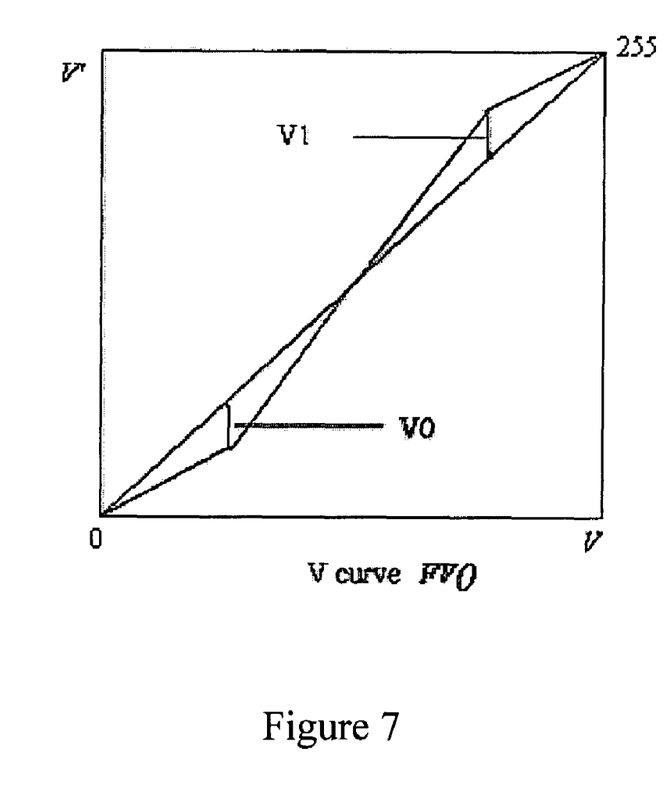
FIG. 7 is a graph illustrating a V curve according to an embodiment of the present invention; and, FIG. 8a is a flow diagram illustrating a flow of processes for improving color saturation and contrast in accordance with an exemplary embodiment of the present invention.

Variation is used to control the color saturation level of the video signal. The following process enhances the contrast of the chrominance signal (U/V) with the neutral point located at the mid-point, which indicates "no color" in the YUV format. In other embodiments that intend to offset color, the neutral point for the chrominance-mapping transfer function can be offset from the mid-point.

Refer to FIG. 6, which is a graph illustrating a U curve according to an embodiment of the present invention and to FIG. 7, which is a graph illustrating a V curve according to an embodiment of the present invention.

FU( ) and FV( ) are the chrominance-mapping transfer functions, which enhance the contrast of chrominance signals.

$U0_{ori}$, $U1_{ori}$, $V0_{ori}$, and $V1_{ori}$ are pre-defined constants that can be tailored to different viewing conditions, such as indoor and/or outdoor. In one embodiment, the mapping curve is weighted by the variance of the chrominance signals $U_{var}$ and $V_{var}$. Signals with relatively large variance typically use less chrominance adjustment, and vice versa. $U_{max}$ and $V_{max}$ are the maximum range of U and V:

$$U0_v = U0_{ori}*(2*U_{max}-sqrt(U_{var}))/(sqrt(U_{var})+U_{max})$$

$$U1_v = U1_{ori}*(2*U_{max}-sqrt(U_{var}))/(sqrt(U_{var})+U_{max})$$

$$V0_v = V0_{ori}*(2*V_{max}-sqrt(V_{var}))/(sqrt(V_{var})+V_{max})$$

$$V1_v = V1_{ori}*(2*V_{max}-sqrt(V_{var}))/(sqrt(V_{var})+V_{max})$$

Let v be the variation ranging from 0 to 100, U0, U1, V0, V1 change linearly with v:

$$U1 = U1_v*v/100$$

$$V1 = V1_v*v/100$$

$$U0 = U0_v*v/100$$

$$V0 = V0_v*v/100$$

Variation in color saturation can be achieved by changing the trajectory of U0, U1, V0, and V1.

Following is a description of details regarding implementation of the movie enhancement method of the present invention.

Let Y, U, and V be the input signal. One embodiment performs the following operations for every frame.

1. Obtain user-input intensity i and variation v.
2. Calculate average and variances $Y_{avg}$, $Y_{var}$, $U_{var}$, $V_{var}$.
3. Calculate luminance-contrast adjustment g(i) from i, $Y_{avg}$, and $Y_{var}$.
4. Construct FG(i) curve from F( ) curve, i, and g(i).
5. Construct FU( ) and FV( ) curve from v, $U_{var}$ and $V_{var}$.

In other embodiments, operations 1-5 described above can be performed on a less frequent basis than every frame to reduce the computation complexity. For example, $Y_{var}$, $U_{var}$, $V_{var}$ can be calculated when $Y_{avg}$ has a significant change. Operations 3 and 4 can be performed when $Y_{avg}$ has a significant change and upon a change in user-input intensity i. Operation 5 can be performed when $U_{var}$ and $V_{var}$ have significant changes and upon a change in user-input variation v.

To reduce the computation complexity, all curves F( ), G( ), FG(,i), FU( ), and FV( ) can be realized as a fixed-point lookup table, and the mapping calculations can be realized by table watching. In other embodiments, a $3^{rd}$ order or higher polynomial is used to emulate those curves.

In another embodiment of the present invention the following operations are performed for every pixel:

6. Get the output luminance signal $Y_{out} = FG(Y,i)$.
7. Get the output chrominance signal $U'=FU(U)$ and $V'=FU(U)$.
8. Restore color saturation from Y-adjustment: let $dY = Y_{out} - Y$, in one embodiment, $Y_{out}/Y$ is simplified as $(128+dY)/128$, thus $$U_{out} = (U'-128)*(128+dY)/128+128$$

$$V_{out} = (V'-128)*(128+dY)/128+128$$

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A method for enhancing a video signal comprising:
   obtaining intensity of luminance values and variation of chrominance values;
   calculating average and variance of said luminance values and said chrominance values;
   calculating a luminance-contrast adjustment based upon said luminance values;
   constructing a luminance curve responsive to a luminance-mapping curve undulating about a point of inflection defined by a neutral point;
   constructing a final enhancement mapping curve based on values of control factor intensity and said luminance values, wherein both ends of the final enhancement mapping curve may be re-interpolated to provide a soft-clipping effect;
   constructing a chrominance curve based upon said chrominance values; and
   applying the luminance curve, the final enhancement mapping curve, and the chrominance curve to the video signal.

2. The method for enhancing a video signal of claim 1, whereby some or all of the operations are performed for every frame of the video signal.

3. The method for enhancing a video signal of claim 1, whereby the intensity and variation are input by a user.

4. The method for enhancing a video signal of claim 1, whereby the curves are realized as a fixed-point lookup table and mapping calculations are realized by table watching or third order of higher polynomials are used to emulate the curves.

5. The method for enhancing a video signal of claim 1, further comprising:
   obtaining an output luminance signal;
   obtaining an output chrominance signal; and
   restoring color saturation from chrominance adjustment.

6. A method for enhancing a video signal comprising:
   obtaining user-input intensity of luminance values and variation of chrominance values;
   calculating average of said luminance values, variance of said luminance values, and variance of said chrominance values;
   calculating luminance-contrast adjustment from intensity of said luminance values, average of said luminance values, and variance of said luminance values;
   constructing a luminance curve from a luminance-mapping curve, intensity of said luminance values, and luminance-contrast adjustment, the luminance-mapping curve undulating about a point of inflection defined by a neutral point;

constructing a final enhancement mapping curve based on values of control factor intensity and said luminance values, wherein both ends of the final enhancement mapping curve may be re-interpolated to provide a soft-clipping effect;

constructing a chrominance curve from variation of said chrominance values and variance of said chrominance values; and applying the luminance curve, the final enhancement mapping curve. and the chrominance curve to the video signal.

7. The method for enhancing a video signal of claim 6, whereby the curves are realized as a fixed-point lookup table and mapping calculations are realized by table watching.

8. The method for enhancing a video signal of claim 6, whereby third order or higher polynomials are used to emulate the curves.

9. The method for enhancing a video signal of claim 6, further comprising:
    obtaining an output luminance signal;
    obtaining an output chrominance signal; and
    restoring color saturation from chrominance adjustment.

10. The method for enhancing a video signal of claim 9, whereby the operations of obtaining the output luminance signal, obtaining the output chrominance signal, and restoring color saturation from chrominance adjustment are performed for every pixel.

* * * * *